United States Patent

Wareham

Patent Number: 5,566,623
Date of Patent: Oct. 22, 1996

[54] WHEEL AND BEARING SYSTEM FOR A LOAD TRANSPORTING OVERHEAD TROLLEY ASSEMBLY

[75] Inventor: Robert C. Wareham, Midland, Mich.

[73] Assignee: Saginaw Products, Inc., Saginaw, Mich.

[21] Appl. No.: 523,539

[22] Filed: Sep. 5, 1995

[51] Int. Cl.$^6$ .................................. B61B 3/00; F16C 33/60
[52] U.S. Cl. ............................. 105/155; 104/95; 384/506; 384/539; 384/903
[58] Field of Search ....................... 105/155; 104/94, 104/95 X; 384/499, 505, 506 X, 539 X, 903 X

[56] References Cited

U.S. PATENT DOCUMENTS

| | | | |
|---|---|---|---|
| 1,093,348 | 4/1914 | Mooers | 384/506 |
| 2,607,642 | 8/1952 | Gilbert | 384/539 |
| 2,614,898 | 10/1952 | Adams | 384/506 |
| 3,192,002 | 6/1965 | Carter, Jr. | 384/506 |
| 4,154,447 | 5/1979 | Francis, Jr. et al. | |
| 4,210,238 | 7/1980 | Frost et al. | |
| 4,334,720 | 6/1982 | Signer. | |
| 4,395,078 | 7/1983 | Smith, Sr. et al. | 384/506 |
| 4,463,994 | 8/1984 | Eliason et al. | 384/506 |
| 4,682,901 | 7/1987 | Hauber | 384/539 |
| 5,066,145 | 11/1991 | Sibley et al. | 384/499 X |
| 5,183,342 | 2/1993 | Daiber et al. | |

FOREIGN PATENT DOCUMENTS

| | | | |
|---|---|---|---|
| 348818 | 4/1905 | France | 384/506 |
| 502354 | 5/1920 | France | 384/506 |

Primary Examiner—Robert J. Oberleitner
Assistant Examiner—Kevin D. Rutherford
Attorney, Agent, or Firm—Learman & McCulloch

[57] ABSTRACT

An improved wheel and bearing assembly for a load transporting overhead trolley with a load support bracket having opposed stems mounting laterally offset wheels in rolling engagement with an overhead track has wheel-incorporated radially inner and outer race members with anti-friction load bearing balls between them in an annular trackway. The radially inner race member is split offset from the line connecting the center of the balls and formed of mating laterally outer and laterally inner abutting members which have laterally mating non-compressible radially abutting surfaces with radially aligned annular grooves therein. A circumferentially compressible retention spring is carried in one of the annular grooves and resiliently projects radially from the groove so that a snap fit is achieved when the inner race members are moved relatively laterally into mating assembly.

14 Claims, 2 Drawing Sheets

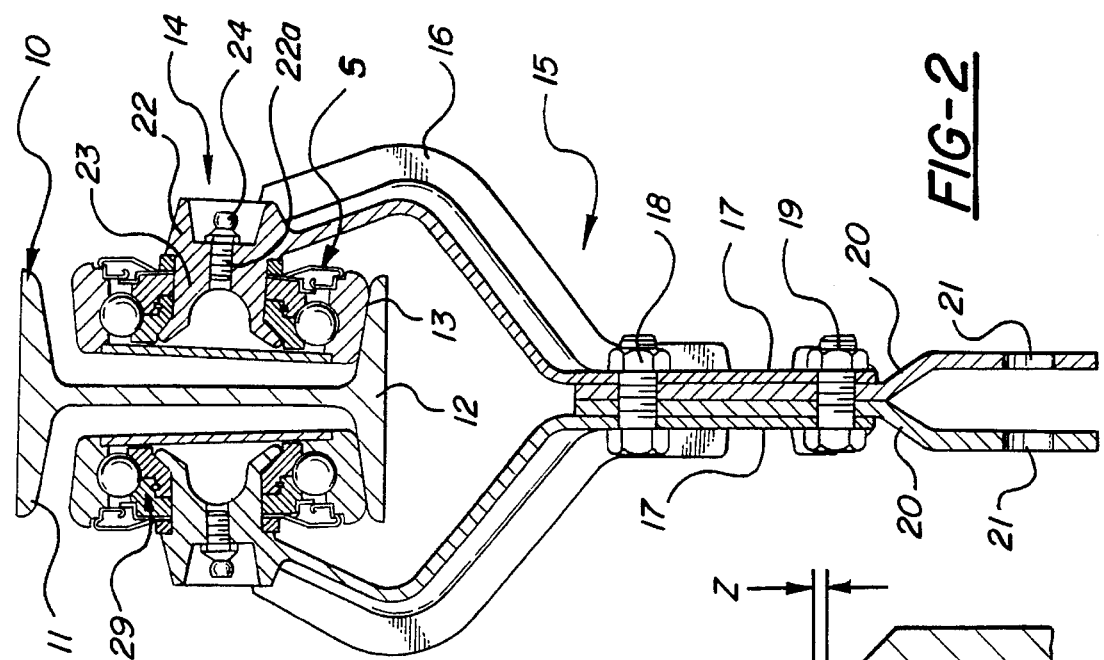
FIG-2
FIG-6
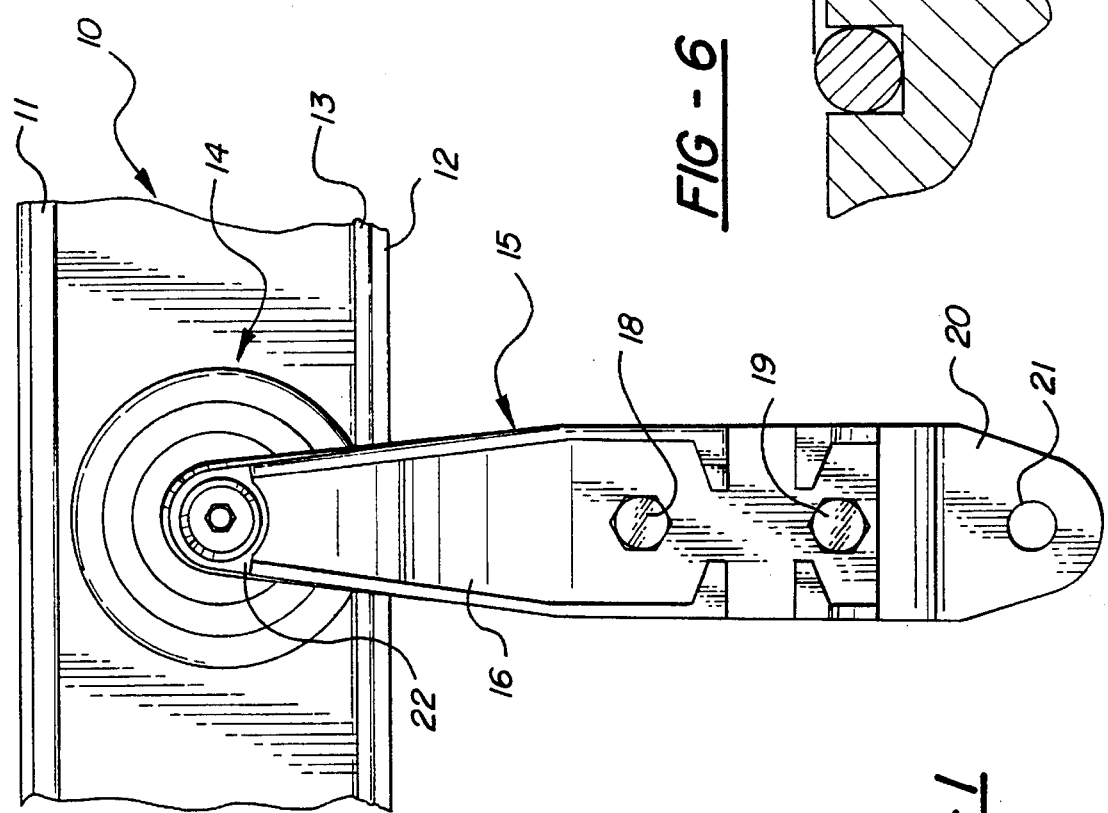
FIG-1

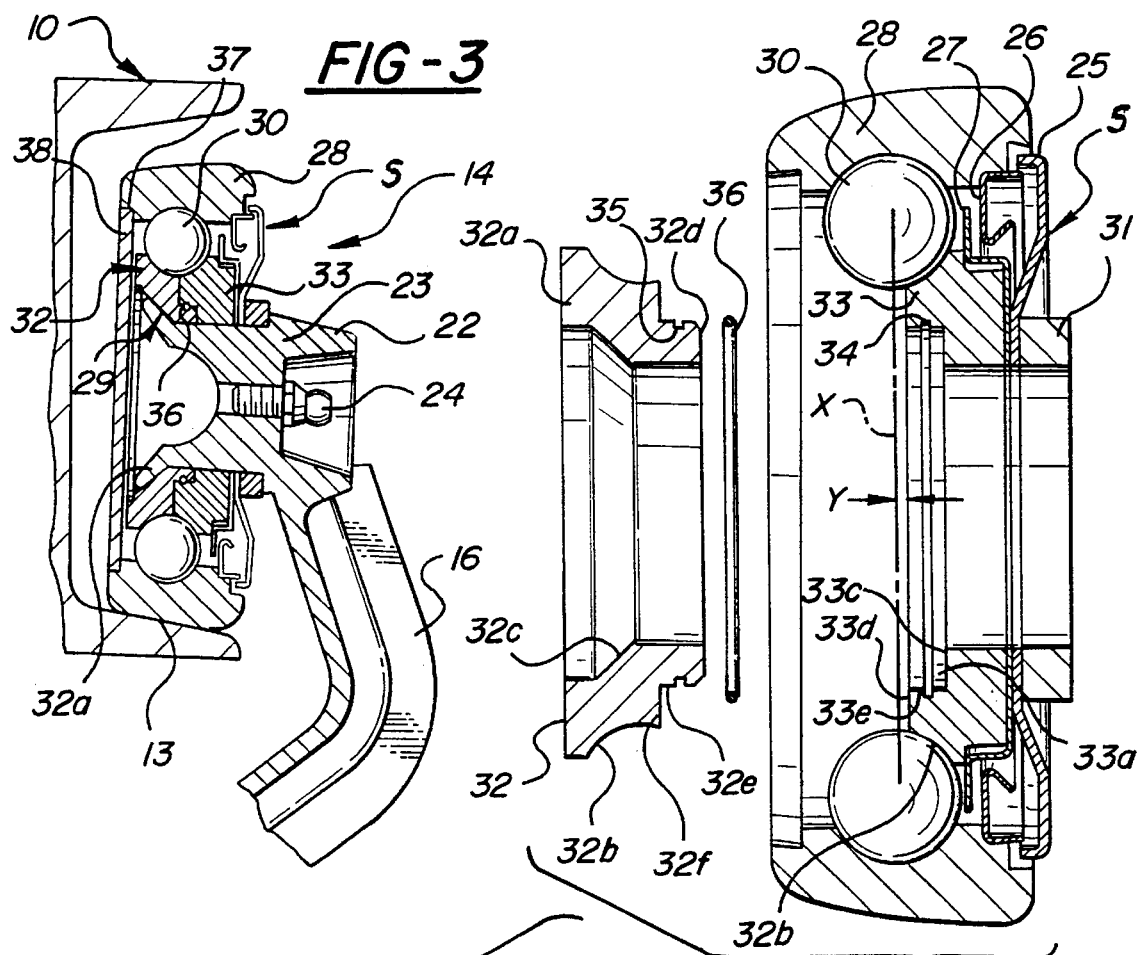
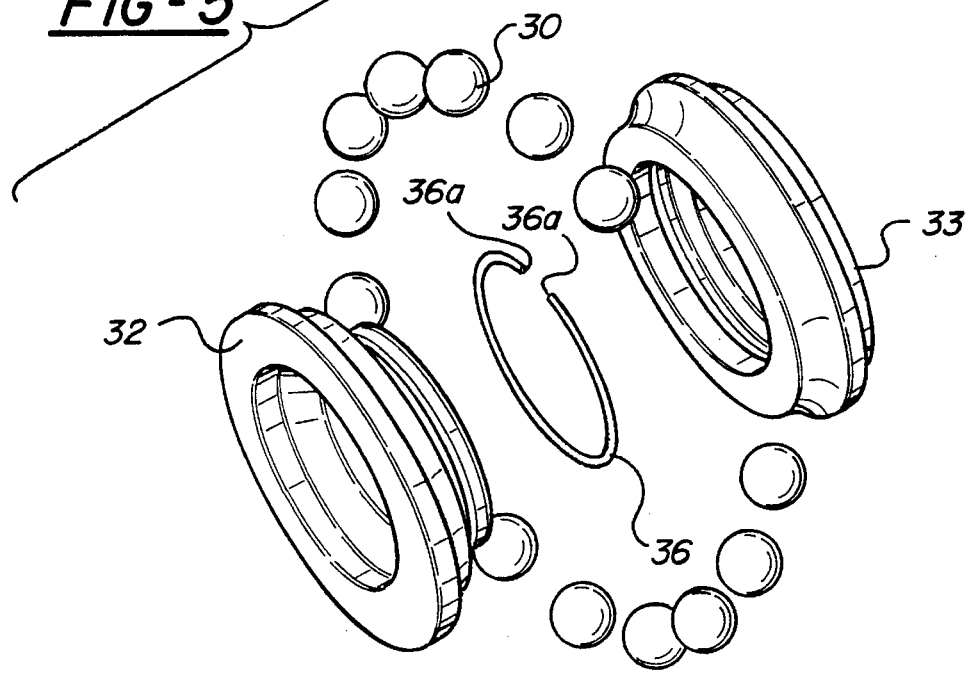

WHEEL AND BEARING SYSTEM FOR A LOAD TRANSPORTING OVERHEAD TROLLEY ASSEMBLY

BACKGROUND OF THE INVENTION

This invention relates to wheel and bearing systems for load transporting overhead trolley assemblies having a load support bracket with opposed stems axially mounting laterally offset wheels in rolling engagement with an overhead track having horizontally inclined wheel support surfaces. In typical manufacturing plants, such overhead trolleys conveyors transport very heavy loads often measured in tons and are subjected to heavy stresses and strains. The overhead track typically is a heavy gauge steel I beam and the trolley parts inclusive of the wheel and bearing systems, are typically formed of non-compressible, non-resilient rugged steel parts. In addition to strength requirements, some of the other considerations recognized by the present invention are the need to control the considerable wear which results over time with use, and the need for wheel bearing componetry which can be easily and economically manufactured and assembled with precision.

SUMMARY OF THE INVENTION

The present invention provides wheel-incorporated radially inner and outer race members with load bearing balls between them in a raceway provided by radially aligned, annular curvilinear grooves. The inner race member is split and formed of incompressible laterally outer and inner abutting steel members to which the load support brackets secure. The laterally inner and outer members abut radially along a split line which is radially offset from the radial center of the balls in a direction toward the laterally inner race component of the radially inner race member, and laterally mating surfaces, provided on the laterally inner and outer members of the inner race member laterally inwardly of the split line, have radially matching annular grooves within which a circumferentially compressible, retention ring spring is provided which normally projects radially sufficiently to provide a snap fit relationship for the two inner race components when the mating surfaces are moved relatively laterally into mating assembly.

One of the prime objects of the present invention is to provide a system of the character described wherein the inner race or cone components can be stronger, because no sleeve is required to connect the race or cone halves together, as presently is the case in many constructions. The radial wall thickness of the cones can be accordingly thicker for the same diameter wheel.

Another important object of the invention is to provide a trolley wheel assembly of the character mentioned which permits the inner cone or race components to snap fit to locate the precise relative position to be maintained, and speed assembly time.

A further object of the invention still is to provide an assembly of the type described wherein the loads applied by the bearing balls are concentrated away from the aforesaid split line to improve load distribution characteristics.

Still a further object of the invention is to provide mating inner cone parts which can be used in a multitude of applications such as when the parts are not swaged to the trolley brackets and are otherwise secured.

A further object of the invention is to provide a construction in which the shipping of the parts is enhanced by the snap ring which keeps the parts in assembled relationship and prevents ball release and loss when the wheels are being separately shipped.

A final object of the invention is to provide a construction in which the laterally outer race part can be of greater strength in order to prevent distortion and failure during the swaging process.

DESCRIPTION OF THE DRAWINGS

The presently preferred embodiment of the invention is disclosed in the following description and in the accompanying drawings, wherein:

FIG. 1 is a side elevational view of a typical overhead trolley assembly;

FIG. 2 is a fragmentary, transverse sectional view of the trolley of the present invention;

FIG. 3 is a considerably enlarged fragmentary view more specifically illustrating the improved wheel and bearing system;

FIG. 4 is a still further enlarged view illustrating a pre-assembled position of some of the components; and FIG. 5 is an exploded view of number of the components; and FIG. 6 is an enlarged, fragmentary transverse sectional view illustrating a retainer spring which is employed.

DESCRIPTION OF THE PREFERRED EMBODIMENT

As FIGS. 1 and 2 particularly indicate, the overhead trolley assembly includes an I beam overhead rail support 10 with upper and lower, lateral flanges 11 and 12 having laterally inclined, wheel-supporting surfaces 13. The steel surfaces 13 each support a trolley wheel and bearing assembly, generally designated 14, which presently will be described in detail. The assemblies 14 then support mating trolley brackets, generally designated 15, of conventional configuration. As shown, the brackets 15 comprise angular upper portions 16 with dependent flange portions 17 which are bolted together as at 18 and 19. Sandwiched between the members 17, are load support bracket attachments 20 which carry the loads to be conveyed along rail 10. The load attachment brackets 20 have the usual load attachment openings 21.

At their upper ends, the bracket portions 16 have wheel attachment head portions 22 with laterally or axially extending stem portions 23 on which the wheel assemblies 14 are received. The head portions 22, which seat against rings 31, can be recessed as at 22a to receive lubrication fittings 24. Provided to prevent the entrance of, for instance, steam, moisture, and other foreign matter is a labyrinth seal of the character disclosed in applicant's assignees U.S. Pat. No. 4,154,447, which I incorporate herein by reference.

The seal, generally designated S in the present drawings, includes an annular outer member generally designated 25, an annular intermediate member generally designated 26, and an annular inner member generally designated 27. The members 25 and 27 are stationary members, ultimately connecting to the trolley bracket parts, and the member 26 is a rotary part connected to the outer wheel race 28 of the wheel and bearing system 14. As FIGS. 3 and 4 particularly indicate, the outer race 28 is rotatably separated from the stationary inner race assembly generally designated 29, by steel ball bearings 30.

While two-piece inner race assemblies, of the type disclosed for example in U.S. Pat. No. 4,210,238, have been developed previously, the present invention provides a load receiving relationship with the balls 30 which is stronger and provides a different and improved inner race or cone assembly 29. The inner race assembly, differently than in U.S. Pat. No. 4,210,238, provides a laterally outer (with relation to the bracket arm which its supports) component generally designated 32, which is considerably beefed up and capable of handling greater loads with better stress distribution characteristics. The laterally inner race component generally designated 33, which interfits with or mates with the annular member 32, remains of considerable radial thickness, and both the steel members 32 and 33 are rugged and durable elements which have improved load distribution characteristics. The laterally outer element 32 includes a main body portion 32a with a curvilinear track way-forming surface 32b and an opposite annular convergent surface 32c which will accommodate swaging of the member 23 as at 23a.

The annular component 32 further includes a radial end wall 32d which is so situated with respect to a radial center line or plane "X" through the train of bearings 30 as to lie laterally inwardly beyond it a predetermined distance. The component 32 is further provided with a laterally inwardly projecting shoulder 32e which is received within an annular recess 33a formed by radially internally shouldering the component 33. It will be seen that the component 33 similarly has a curvilinear surface 33b mating with the surface 32b to form the inner surface of the curvilinear trackway for balls 33. Component wall 32d and component 33 radial wall 33c mate in abutting relation, as do the shoulder or flange radial walls 32f on component 32 and the radial wall 33d on annular component 33. It has been determined that the lateral offset "y" (see FIG. 4) between the radial center line "X" and the radial wall 33d should be substantially 60 thousandths of an inch.

Provided laterally inboard of the walls 32f and 33d on the shoulder radial surfaces 32e and 33e which provide slide surfaces are radially aligned annular grooves 34 in the member 33 and 35 in the member 32. Received within the grooves, and particularly in groove 35 (see FIG. 6), is a split ring spring 36. It has terminal ends 36a which normally have a predetermined gap between them as shown in FIG. 5. The resilient spring 36 in non-compressed condition is of such diameter relative to the groove 35 that it normally protrudes a distance "z" (see FIG. 6) from the groove 35.

When the components 32 and 33 are to be assembled, the wheel can be disposed horizontally so that the balls 30 are supported in position by the member 33. When the parts 32 and 33 are moved together in the assembly operation, the spring 36 is forced to circumferentially compress so that the piece 32 fits into the piece 33. When the parts 32 and 33 reach their predetermined relative position, the spring 36 seeks to return to the original position shown in FIG. 5. Once the grooves 34 and 35 come into alignment, the spring 36 can return with a "snap" to project radially in the manner disclosed in FIG. 6. The construction precisely locates the two inner race components 32 and 33 such that, when they are in assembled relation, surfaces 32d and 33c and 33d and 32f are in facial engagement. It is, then, after the piloted assembly of the annular steel parts 32 and 33, that the member 23 can be swaged as at 23a. It will be observed that the radially outer wheel race 28 is recessed as at 37 to receive the usual slightly convex annular cap 38 with a spring fit.

When the members 32 and 33 are assembled the wheel and bearing assemblies are often shipped loosely without being secured to the trolley bracket and spring 36 will maintain their assembled relationship. Also, spring 36 will retain the parts when another method is used to secure the bracket part 23 to the wheel assembly.

It is important to observe that the grooves 34, 35 and spring 36 are disposed laterally inboard of the split line formed by surfaces 32d and 33c. This design permits the outer cone part 32 in dual-piece cone or race structures to be stronger and handle swaging pressures, and concentrates the load supplied by the ball bearings 30 away from the split line to thereby improve wear characteristics.

In practice, of course, the trolley brackets do not rotate and it is the outer race wheel 28 which rotates as it moves along the I beam surfaces 13 and carries its usually very heavy load.

I claim:

1. An improved wheel and bearing system in combination with a load support bracket having a laterally angularly outwardly projecting system-mounting stem supporting said system for rolling travel along an overhead track having a wheel support surface; comprising a. wheel-incorporated, radially inner and outer race members with anti-friction load bearing balls between them, said radially inner and outer race members having laterally aligned, annular, curvilinear grooves compositely forming a raceway for receiving said balls and retaining them between said race members;

b. said radially inner race member being split and formed of mating laterally outer and laterally inner abutting members, both of which have bores receiving said bracket stem; and c. laterally mating, non-compressible radial slide surfaces on said laterally inner and outer members with radially aligned generally annular grooves formed in said respective slide surfaces and a circumferentially compressible, separable, retention ring spring carried in one of said annular grooves and projecting radially into the other groove sufficiently to provide a snap fit relationship when the said laterally inner and outer radially inner race members are moved relatively laterally with said respective slide surfaces in sliding relationship, into mating assembly.

2. The system of claim 1 wherein said ring spring is split to provide terminal ends, and normally has a predetermined gap between its terminal ends.

3. The system of claim 1 wherein said laterally inner and outer abutting members have interfitting shoulders and said laterally mating slide surfaces are provided on said shoulders.

4. The system of claim 3 wherein the shoulder on said laterally outer abutting member is radially inboard of the shoulder on said laterally inner abutting member.

5. The system of claim 1 wherein said abutting laterally inner and outer members engage radially along a split line offset from a radial plane through the radial centers of said balls in a direction toward said laterally inner abutting member.

6. The system of claim 1 in which said annular grooves and ring are laterally inboard of and offset from said split line.

7. The system of claim 6 in which said offset is at least sixty thousandths of an inch.

8. The system of claim 1 in which said mating slide surfaces are unthreaded smooth surfaces.

9. A method of making an improved wheel and bearing system for a load transporting overhead trolley assembly having a load support bracket stem mounting a laterally offset wheel comprising:

a. providing wheel incorporated radially inner and outer race members with anti-friction load bearing rolling members between them in a trackway compositely formed by the radially inner and outer race members, the inner race member being split and formed of mating laterally outer, and laterally inner, abutting members, the radially inner member having a bore for receiving the trolley bracket stem, the laterally inner and outer members having laterally mating, non-compressible radial slide surfaces with annular grooves therein and, one of the laterally inner and outer members carrying a circumferentially compressible retention ring spring; and b. assembling said mating laterally outer and laterally inner abutting members by moving them relatively laterally with said respective slide surfaces in sliding relationship to circumferentially compress the spring until the said grooves align and the spring can snap radially into the other of said grooves.

10. The method of claim 9 in which said abutting laterally inner and outer members are engaged radially along a split line laterally inwardly offset from a line through the center of said balls.

11. An improved wheel and bearing system for a load transporting overhead trolley assembly having a load support bracket with an axially outwardly projecting stem mounting a laterally outwardly offset wheel in rolling engagement with an overhead track; comprising:

a. wheel-incorporated, radially inner and outer race members with a plurality of anti-friction load bearing rotatable members between them, said radially inner and outer race members having laterally aligned, annular, race grooves compositely forming a raceway for receiving said members and retaining them between said race members;

b. said radially inner race member being formed of mating laterally outer and laterally inner abutting members, having a bore for receiving the bracket stem, and which have interfitting shoulders connected with abutting split line radial surfaces which are laterally offset from a radial plane extending through the centers of said members in a direction toward said laterally inner abutting member to distribute more load to said laterally outer abutting member; and c. laterally mating, non-compressible radial slide surfaces on said shoulders of the inner and outer members with radially aligned grooves respectively therein, and a compressible, separable, resilient retention spring carried in one of said annular grooves and normally projecting radially into the other groove sufficiently to provide a snap fit relationship when the said laterally inner and outer radially inner race members are moved relatively laterally with said respective slide surfaces in sliding relationship into mating assembly.

12. The system of claim 11 wherein said spring is split to provide terminal ends, and normally has a predetermined gap between its terminal ends.

13. The system of claim 11 wherein the shoulder on said laterally outer abutting member is radially inboard of the shoulder on said laterally inner abutting member and said offset is at least sixty thousandths of an inch.

14. The system of claim 11 which said mating slide surfaces are unthreaded smooth surfaces.

* * * * *